March 2, 1926.
G. S. KOHUT
PLOW
Filed Jan. 31, 1923
1,575,171
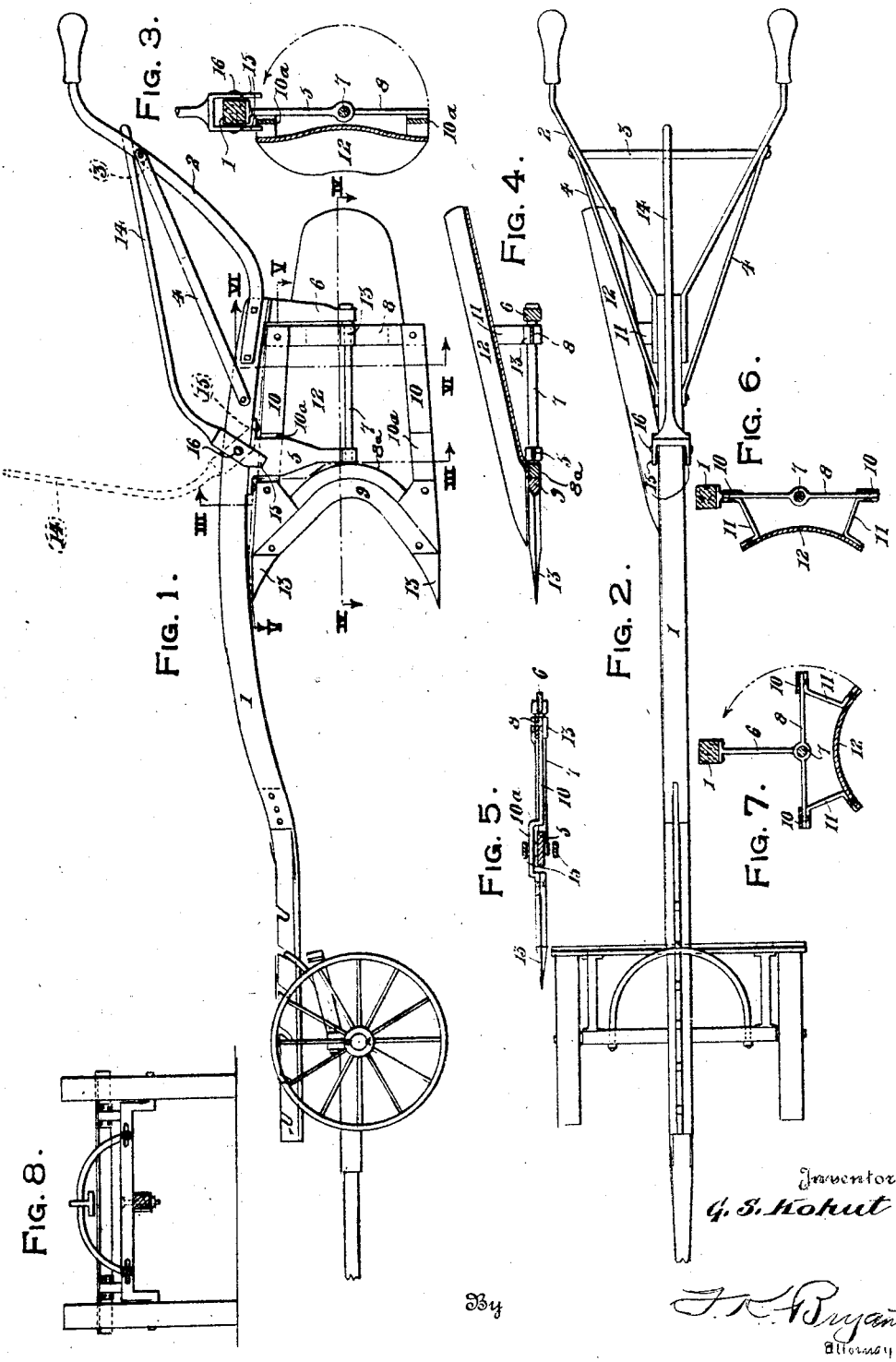

Patented Mar. 2, 1926.

1,575,171

UNITED STATES PATENT OFFICE.

GEORGE S. KOHUT, OF KOOI, WYOMING.

PLOW.

Application filed January 31, 1923. Serial No. 616,151.

*To all whom it may concern:*

Be it known that I, GEORGE S. KOHUT, a citizen of Poland, residing at Kooi, in the county of Sheridan and State of Wyoming, have invented certain new and useful Improvements in Plows, of which the following is a specification.

This invention relates to certain new and useful improvements in plows, and particularly to a plow of reversible type wherein a double mold board carrying spaced plow points is pivotally supported at the rear end of the plow beam, the mold board being rigidly supported in its reversed positions at opposite sides of the beam.

With the above and other objects in view as the nature of the invention is better understood, the same consists of the novel form, combination and arrangement of parts hereinafter more fully described, shown in the accompanying drawing and claimed.

In the drawing, wherein like reference characters designate corresponding parts throughout the several views, Figure 1 is a side elevational view of a reversible plow constructed in accordance with the present invention, showing the double mold board pivotally supported at the rear end of the plow beam with the locking lever illustrated by dotted lines in its released position to permit the reverse positioning of the mold board, Figure 2 is a top plan view of the plow, Figure 3 is a cross-sectional view taken on line III—III of Fig. 1 showing the locking lever pivotally mounted on the plow beam and engaging the mold board.

Figure 4 is a detail horizontal sectional view taken on line IV—IV of Fig. 1,

Figure 5 is a detail horizontal sectional view taken on line V—V of Fig. 1,

Figure 6 is a vertical cross-sectional view taken on line VI—VI of Fig. 1 showing the pivotal mounting of the mold board, Figure 7 is a detail sectional view, similar to Fig. 6 showing the direction of movement of the double mold board, and Figure 8 is a front elevational view of the carriage associated with the forward end of the plow beam, the plow beam and pole of the carriage being shown in section.

Referring more in detail to the accompanying drawing, there is illustrated a reversible plow embodying a beam 1 supported at its forward end by a wheeled carriage, the rear end of the beam being provided with handle bars 2 connected by a cross brace 3 with brace rods 4 extending between the beam and handle bars as clearly shown in Figs. 1 and 2.

The rear end of the plow beam 1 carries a hanger that pivotally supports a double mold board, the hanger including spaced longitudinally alined depending arms 5 and 6 having a horizontal shaft 7 secured in the lower ends thereof. The support for the double mold board further includes a frame structure embodying a rear cross bar 8 and a forward arch bar 9 which has its forward edge sharpened, the rear and forward bars being connected at their outer ends by side rails 10, brackets 11 extending from one side of the bar 8 support the rear portion of a double mold board 12 which is connected at its forward arched edge to an arched bearing bar 8ª which in turn is connected to the arched forward bar 9, as clearly shown in Figs. 1, 4, 6 and 7, while a plow point 13 is carried by each end of the arched bar 9 cooperating with the adjacent side of the double mold board 12, as will at once be obvious from an inspection of Figs. 1 and 4. The bars 8 and 8ª of the plow supporting frame are journaled as at 13 on the shaft 7 of the plow beam hanger and may be shifted from one side of the beam 1 to the other side thereof, such movement being illustrated in Fig. 7.

To hold the plow supporting frame in its shifted position at either side of the beam 1, a relatively long lever 14 is bifurcated at one end thereof to provide side legs 15 that straddle the beam 1 and are pivoted thereto as at 16 at a point above the hanger bracket 5 as shown in Fig. 1, the lower ends of the legs 15 extending beneath the lower edge of the beam 1 for enclosing the adjacent side rails 10 of the mold board supporting frame as shown in Figs. 3 and 5, the side rails 10 having offset portions 10ª that receive the hanger bracket 5 as shown in Fig. 5, permitting the side rails 10 to be positioned for engagement by the lever legs 15.

When the double mold board is in either of its positions as shown in Fig. 1, the locking lever 14 therefor presents the legs 15 for engaging an adjacent side rail 10 of the mold board supporting frame with the rear end of the lever 14 resting upon the cross rod 3 of the handle. In reversing the position of the mold board, the lever 14 is moved forwardly as shown by dotted lines in Fig. 1 shifting the lower ends of the legs 15 above the lower edge of the plow beam 1 and permitting the mold board supporting frame to be pivotally moved on the supporting shaft 7 to the opposite side of the plow beam where the same is clamped in operative position by the lever 14. The wheeled carriage at the forward end of the beam may be of any conventional type, an adjustable connection between the beam and carriage being shown permitting various depth cuts of the plow.

While there is herein shown and described the preferred embodiment of the present invention, it is nevertheless to be understood that minor changes may be made therein without departing from the spirit and scope thereof as claimed.

What is claimed as new is:—

In a reversible plow, a mold board support comprising a forward arch bar having its forward edge sharpened to provide a cutting edge, a rear cross bar, side rails each connected forwardly to one end of the arch bar and rearwardly to one end of the cross bar, a double mold board having its forward edge connected to an arched bearing bar which is secured to the arch bar of the mold board support, brackets extending from the ends of the rear cross bar and connected to the rear portion of the mold board, a shaft extending from said arched bearing bar rearwardly through the cross bar, a beam, and a pair of depending arms secured to the under side of the beam and lying respectively immediately behind the arched bearing bar and the cross bar, said arms having journal ends supporting said shaft.

In testimony whereof I affix my signature.

GEORGE S. KOHUT.